(12) United States Patent
Challoner

(10) Patent No.: US 7,100,444 B2
(45) Date of Patent: *Sep. 5, 2006

(54) ISOLATED RESONATOR GYROSCOPE

(75) Inventor: A. Dorian Challoner, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 292 days.

This patent is subject to a terminal disclaimer.

(21) Appl. No.: 10/405,178

(22) Filed: Apr. 2, 2003

(65) Prior Publication Data

US 2004/0200280 A1   Oct. 14, 2004

Related U.S. Application Data

(63) Continuation of application No. 09/928,279, filed on Aug. 10, 2001, now Pat. No. 6,629,460.

(51) Int. Cl.
G01P 9/04 (2006.01)

(52) U.S. Cl. .................. 73/504.02; 73/504.12

(58) Field of Classification Search ............................ 73/504.02–504.04, 504.12, 503.3, 504.14
See application file for complete search history.

(56) References Cited

U.S. PATENT DOCUMENTS

| | | | | |
|---|---|---|---|---|
| 392,650 | A | 11/1888 | Watrous | 73/504.12 |
| 5,203,208 | A * | 4/1993 | Bernstein | 73/504.12 |
| 5,226,321 | A | 7/1993 | Varnham et al. | 73/514.02 |
| 5,646,346 | A | 7/1997 | Okada | 73/504.04 |
| 5,665,915 | A | 9/1997 | Kobayashi et al. | 73/514.32 |
| 5,783,749 | A | 7/1998 | Lee et al. | 73/504.12 |
| 5,894,090 | A * | 4/1999 | Tang et al. | 73/504.02 |
| 5,905,202 | A | 5/1999 | Kubena et al. | 73/504.15 |
| 5,920,012 | A | 7/1999 | Pinson | 73/504.12 |
| 5,987,985 | A * | 11/1999 | Okada | 73/504.04 |
| 6,009,751 | A | 1/2000 | Ljung | 73/504.04 |
| 6,044,705 | A | 4/2000 | Neukermans et al. | 73/504.02 |
| 6,155,115 | A * | 12/2000 | Ljung | 73/504.12 |
| 6,164,134 | A | 12/2000 | Cargille | 73/504.02 |
| 6,282,958 | B1 | 9/2001 | Fell et al. | 73/504.13 |
| 6,289,733 | B1 | 9/2001 | Challoner et al. | 73/504.04 |
| 6,367,786 | B1 | 4/2002 | Gutierrez et al. | 267/136 |
| 6,515,278 | B1 | 2/2003 | Wine et al. | 250/234 |
| 6,584,845 | B1 * | 7/2003 | Gutierrez et al. | 73/514.15 |
| 2003/0029238 | A1 | 2/2003 | Challoner | 73/504.04 |

FOREIGN PATENT DOCUMENTS

| | | |
|---|---|---|
| DE | 44 42 033 A1 | 5/1996 |
| WO | WO 96/38710 | 12/1996 |

(Continued)

OTHER PUBLICATIONS

European Search Report for EP 04 00 3915.

(Continued)

*Primary Examiner*—John E. Chapman
*Assistant Examiner*—Tamiko Bellamy
(74) *Attorney, Agent, or Firm*—Origin Law; Bradley K. Lortz

(57) ABSTRACT

The present invention discloses a resonator gyroscope comprising a resonator including two bodies, each with a center of mass and transverse inertia symmetry about an axis that are substantially coincident and each supported by one or more elastic elements and wherein the bodies together forming two differential rocking modes of vibration transverse to the axis with substantially equal frequencies and wherein the two bodies transfer substantially no net momentum to the baseplate when the resonator is excited. The gyroscope further includes a baseplate affixed to the resonator by the one or more elastic elements.

26 Claims, 3 Drawing Sheets

FOREIGN PATENT DOCUMENTS

WO    WO 98/15799    4/1998

OTHER PUBLICATIONS

D. Wright et al., "The HRG Applied to a Satellite Attitude Reference System," Guidance and Control, American Astronautical Society, Advances in Astronautical Sciences, 1994, 86:1-13.

M. W. Putty et al., "A Micromachined Vibrating Ring Gyroscope," Solid State Sensor and Actuator Workshop, Transducer Research Foundation, Hilton Head, 1994, pp. 213-220.

T.K. Tang et al., "Silicon Bulk Micromachined Vibratory Gyroscope," Solid State Sensor and Actuator Workshop, Transducer Research Foundation, Hilton Head, South Carolina, Jun. 2-6, 1996, 6 pgs.

N. Barbour et al., "Micromechanical Silicon Instrument and Systems Development at Draper Laboratory," A1AA Guidance Navigation and Control Conference, American Institute of Aeronautics and Astronautics, San Diego, CA, Jul. 29-31, 1996, Paper No. 96-3709, pp. 1-7.

J. D. Johnson et al., "Surface Micromachined Angular Rate Sensor," A1995 SAE Conference, Paper No. 950538, pp. 77-83.

* cited by examiner

ISOLATED RESONATOR GYROSCOPE

CROSS-REFERENCE TO RELATED APPLICATIONS

This application is a continuation and claims the benefit under 35 U.S.C. § 120 of the following and commonly-assigned U.S. patent application, which is incorporated by reference herein:

U.S. application Ser. No. 09/928,279, filed Aug. 10, 2001 now U.S. Pat. No. 6,629,460, by A. Dorian Challoner, entitled "ISOLATED RESONATOR GYROSCOPE."

STATEMENT OF GOVERNMENT RIGHTS

This invention was made with Government support under Contract No. F04606-95-D-0070 awarded by the Government. The Government has certain rights in this invention.

BACKGROUND OF THE INVENTION

1. Field of the Invention

The present invention relates to gyroscopes, and in particular to improved resonator microgyroscopes and their manufacture.

2. Description of the Related Art

Gyroscopes are used to determine direction based upon the sensed inertial reaction of a moving mass. In various forms they are often employed as a critical sensor for vehicles such as aircraft and spacecraft. They are generally useful for navigation or whenever it is necessary to determine the orientation of a free object.

Older conventional gyroscopes were very heavy mechanisms, employing relatively large spinning masses by current standards. A number of recent technologies have brought new forms of gyroscopes, including optical gyroscopes such as laser gyroscopes and fiberoptic gyroscopes as well as vibratory gyroscopes.

Spacecraft often depend on inertial rate sensing gyroscopic systems to supplement attitude control. Typical systems employ conventional spinning mass gyroscopes or conventionally-machined hemispherical resonator gyroscopes to provide the high pointing stability required for spacecraft payloads operating high above the earth. However, both of these types of gyroscopes are expensive, large and heavy.

Some prior symmetric vibratory gyroscopes have been produced, however, their vibratory momentum is transfered directly to their baseplates or packages. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation. In addition, shell mode gyroscopes, such as the hemispherical resonator gyroscope and vibrating ring gyroscope, which can have desirable isolation and vibrational symmetry attributes, are not suitable for thin planar silicon implementation with sensitive electrostatic sensors and actuators that take advantage of the large planar areas of the device The scale of previous silicon microgyroscopes (e.g., U.S. Pat. No. 5,894,090) has not been optimized for navigation grade performance resulting in higher noise and drift than desired. This problem stems from use of thin eptiaxially grown silicon flexures to define critical vibration frequencies that are limited to 0.1% thickness accuracy and limit device sizes to a few millimeters. The former results in high drift due to vibrational asymmetry or unbalance and the latter results in high rate noise due to lower mass increasing thermal mechanical noise and lower area increasing capacitance sensor electronics noise. Scaling up of non-isolated silicon microgyros is also problematic because external energy losses will increase with no improvement in resonator Q and no reduction in case-sensitive drift. An isolated, cm scale resonator with many orders of magnitude in 3D manufacturing precision is required for navigation grade performance. Conventionally machined navigation grade resonators such as in hemispherical or shell gyros have the optimum scale, e.g. 30 mm and 3D manufacturing precision and hence desirable drift and noise performance, however are expensive and slow to make. Conventional laser trimming of mechanical resonators can further improve manufacturing precision to some degree, however it is not suitable for microgyros with narrow mechanical gaps and has limited resolution necessitating larger electrostatic bias adjustments in the final tuning process.

There is a need in the art for small microgyros with greatly improved performance for navigation and spacecraft payload pointing. There is also a need for such gyros to be cheaper and more easily manufactured with greater 3D mechanical precision. Finally, there is a need for such gyros to have desirable isolation and vibrational symmetry attributes while being compatible with planar silicon manufacturing. The present invention satisfies all these needs.

SUMMARY OF THE INVENTION

The present invention discloses a resonator gyroscope comprising a resonator including two bodies, each with a center of mass and transverse inertia symmetry about an axis that are substantially coincident and each supported by one or more elastic elements and wherein the bodies together form two differential rocking modes of vibration transverse to the axis with substantially equal frequencies and transferring substantially zero net momentum to the baseplate. The gyroscope further includes a baseplate affixed to the resonator by the one or more elastic elements and sense and drive elements each affixed to the resonator and baseplate. An isolated resonator microgyroscope is thereby provided having no coupling of its sense or drive mode to baseplate or package motion except through Coriolis accelerations when a differential rocking mode is internally driven.

One embodiment of the invention comprises a resonator including a proof mass and a counterbalancing frame affixed to the proof mass by one or more elastic elements. The resonator is affixed to a baseplate by the one or more elastic elements. Sense and drive elements are each affixed to the resonator and baseplate. The proof mass and counterbalancing frame produce substantially no net momentum transfer or reaction on the baseplate when a resonator differential rocking mode is excited. The resonator excluding central proof mass may be etched from a single thick silicon wafer or from a thin silicon wafer to which is bonded a post proof mass.

An all-silicon, symmetric vibratory gyroscope of the present invention is inexpensive to produce using photolithography and because of its unique isolated design can be scaled large enough (e.g. 20 mm mesoscale resonator) to achieve the low noise and low drift performance required for navigation. Combined with a low cost closed loop analog control system, a mesoscale navigation grade inertial reference unit would be very inexpensive for relatively small manufacturing quantities. Furthermore, combined with a low-power digital control electronics application specific integrated circuit (ASIC) for much larger volumes, a "golf ball-sized" inertial navigation unit is feasible. For example, in unit quantities of approximately 3,000 per year, it is estimated that such a unit would cost less than $3,000.

The present invention provides an affordable vibratory gyroscope with navigation grade performance by means of a precision isolated symmetric planar resonator of optimum scale that can be fabricated with silicon photolithography from commercial double-side polished silicon wafers with low total thickness variation. Previous navigation grade vibratory gyroscopes with isolated resonators have relied on conventional lathes or milling machines yielding slow and expensive 3D precision machining and assembly, e.g. quartz hemispheric resonator gyroscopes, or employed non-isolated resonators mounted on low-frequency isolaters to gain a degree of isolation at the expense of increasing seismic suspension mass and increased deflections due to gravity loads. Asymmetric tuning fork vibratory gyroscopes provide isolation about the drive axis only and are subject to external disturbance about the output sense axis. The cloverleaf microgyroscope of U.S. Pat. No. 5,894,091 as previously mentioned is subject to external disturbances about its drive and output axes.

BRIEF DESCRIPTION OF THE DRAWINGS

Referring now to the drawings in which like reference numbers represent corresponding parts throughout.

DETAILED DESCRIPTION INCLUDING PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

1.0 Overview

The key principle of the present invention is to provide a resonator comprising two bodies with transverse intertia symmetry about an axis aligned with an input axis and elastically supported so that their axes of symmetry and centers of mass coincide and together form two differential rocking modes of vibration transverse to the axis of symmetry. The two bodies are supported in a case having an inertial rate input axis and exhibit substantially equal frequencies distinct from other modes of vibration, mutually orthogonal and imparting substantially zero net momentum to the case. There is further an internal actuation means aligned to drive a first one of the differential rocking modes to vibrate and a sensing means aligned to sense the motion of the second differential rocking mode induced by Coriolis accelerations resulting from the inertial rate input and internally driven differential rocking motion about the first mode axis.

In the example embodiments which follow a first one of the bodies is a proof mass, a second one of the bodies is a counterbalancing frame and the case may include a baseplate. Other equivalent structures and arrangements will be readily apparent to those skilled in the art.

2.0 Example Embodiments

All vibratory gyroscopes employ a rotation sensing mechanical element which is driven to oscillate in a first mode, i.e. the input or drive mode. A Coriolis acceleration of the element under rotation induces energy transfer from the input mode to a second mode, i.e. the output or sense mode. The second mode produces an excitation in the sense element which is then detected. Optimum performance of a vibratory gyroscope is obtained when the drive and sense modes have the same resonant frequency and a high Q factor. The response to the Coriolis acceleration is then mechanically amplified by the Q factor of the resonance and provides improved sensor performance. Closed loop control of the resonator sense mode (e.g. U.S. Pat. No. 6,360,601 to Challoner et al., which is hereby incorporated by reference herein) provides Coriolis force-rebalance, sense mode damping and wide gyroscope bandwidth.

Figure 1:
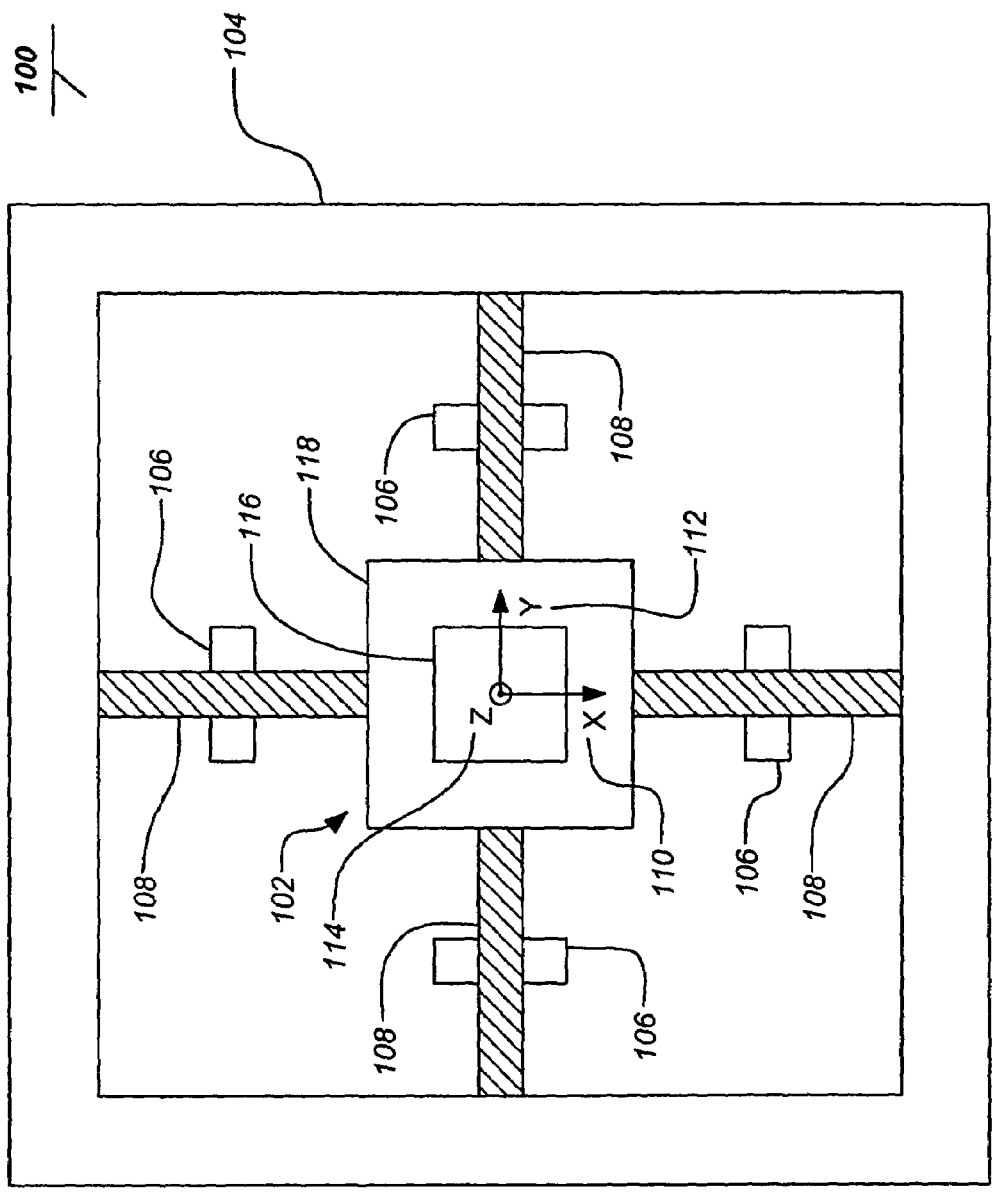
FIG. 1 depicts a top view of a reactionless resonator gyroscope of the present invention.

FIG. 1 depicts a top view of a reactionless resonator gyroscope 100 embodiment of the present invention. The gyroscope 100 comprises a unique resonator which includes a proof mass 102 and a counterbalancing frame 104. The counterbalancing frame 104 has a rocking inertia substantially comparable to that of the proof mass 102 and these two bodies interact as described above. The counterbalancing frame 104 and proof mass 102 are coupled to a baseplate 106 (represented in FIG. 1 by four mounting points) by way of elastic elements 108. The principal axes of concern which will be referenced throughout the specification are the X axis 110, the Y axis 112 and the Z axis 114 (which is directed out of the page of FIG. 1). The counterbalancing frame 104 can also designed in any other shape, such as a circular ring or other arbitrary shape so long as the two bodies (proof mass 102 and counterbalancing frame 104) interact as previously described.

Figure 2:
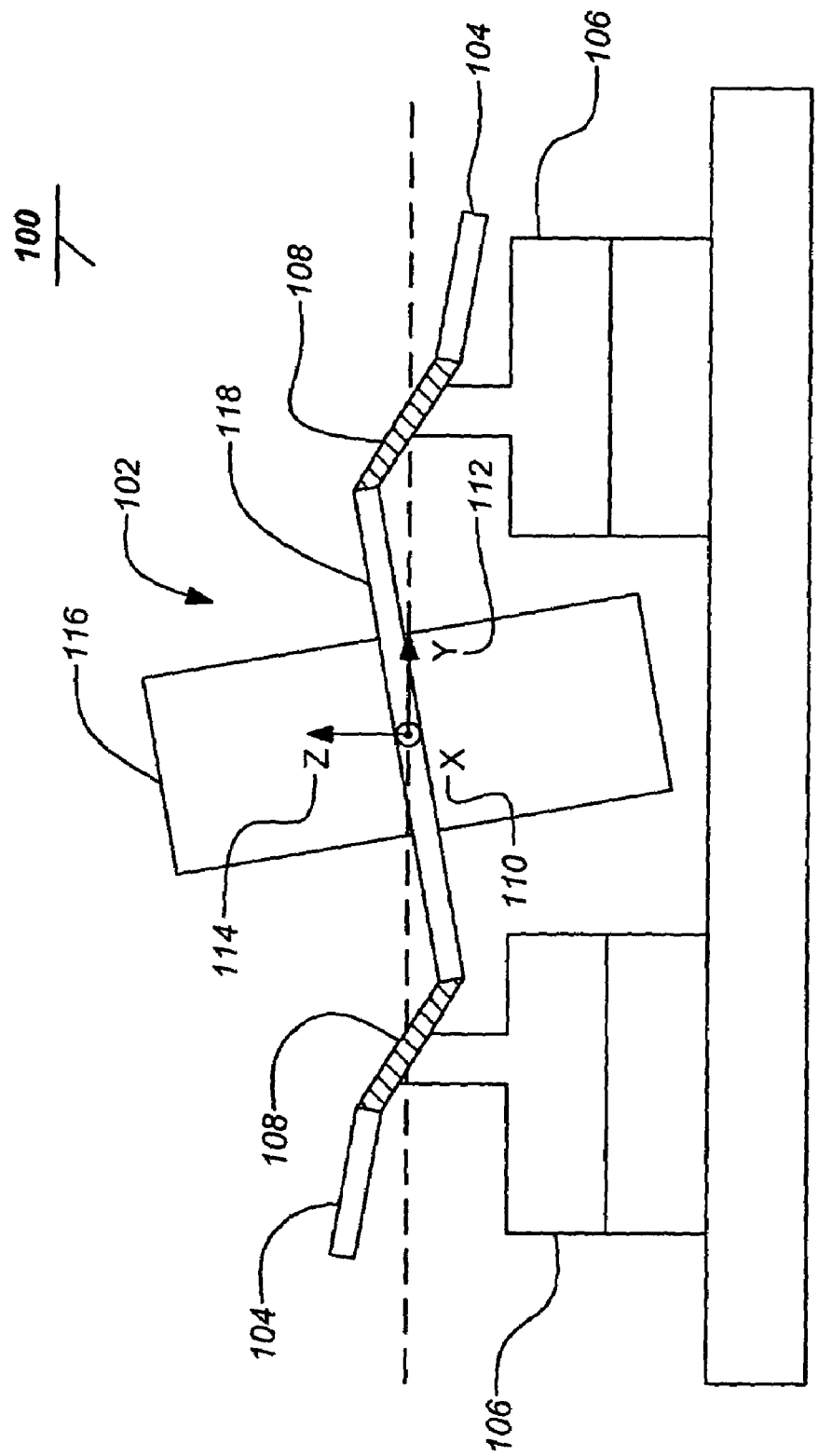
FIG. 2 depicts a side view of a reactionless resonator gyroscope of the present invention in a displaced position.

FIG. 2 depicts a side view of a reactionless resonator gyroscope 100 of the present invention in a displaced position. The gyroscope is shown displaced about the X axis 110. The mechanical assembly comprises a central inertia proof mass 102 element attached to an outer counterbalancing frame 104 and to a baseplate 106 via elastic beam flexure elements 108. In one embodiment, the counterbalancing frame 104, elastic elements 108 and baseplate 106 for the inertia proof mass 102 can be photolithographically etched through from the same double-side polished crystal silicon wafer to produce a precision planar resonator gyroscope.

Key to the present invention is that the axisymmetric resonator is coupled to a baseplate 106 such that the axisymmetric counterbalancing frame 104 can freely vibrate against the axisymmetric central proof mass 102 with counterbalanced oscillatory rocking motion and resulting in a distinct differential rocking mode with no momentum transfer to or net reaction on the baseplate 106.

The baseplate 106 may be a relatively thick silicon plate of rigid material. Such a thick rigid baseplate 106 could be directly bonded to the rest of the gyroscope in a vacuum package. Alternatively, a more flexible thin baseplate 106 may be used to reduce cost and ease assembly with standard wafer processing equipment. Common elasticity in the resonator elastic elements such as in the attachment to the baseplate provides inherent separation of the differential rocking mode frequency from the common rocking mode of vibration. The singular attribute of any of these arrangements is that any external motion of the gyroscope package cannot excite differential rocking motion of the resonators, unless such motion is first internally driven and only then by virtue of Coriolis accelerations due to rotation of the gyroscope about the input axis or axis of inertial symmetry.

The proof mass 102 can be constructed in various forms, however the inertial distribution of the central proof mass is designed to have more mass out of plane than the frame and hence higher angular gain, or Coriolis reaction to inertial rate input. To achieve this, a typical configuration for the proof mass 102 includes a vertical portion 116 (elongated along the Z axis 114) and a plate portion 118 (in the X-Y plane). The vertical portion 116 and plate portion 118 of the proof mass 102 may be formed together from a thick silicon wafer for manufacturing ease as previously mentioned. Alternately, the proof mass 102 may be formed by bonding on the vertical portion 116 as a separate central post to the plate portion 118 formed from the silicon wafer.

Electrostatic driving and sensing can be implemented with the sense and drive elements positioned on the large planar surfaces of the resonator and the baseplate 102. The sense and drive elements may be positioned on either the counterbalancing frame 104 or the proof mass 102 (typically the plate portion 118 of the proof mass 102) of the resonator.

Figure 3:
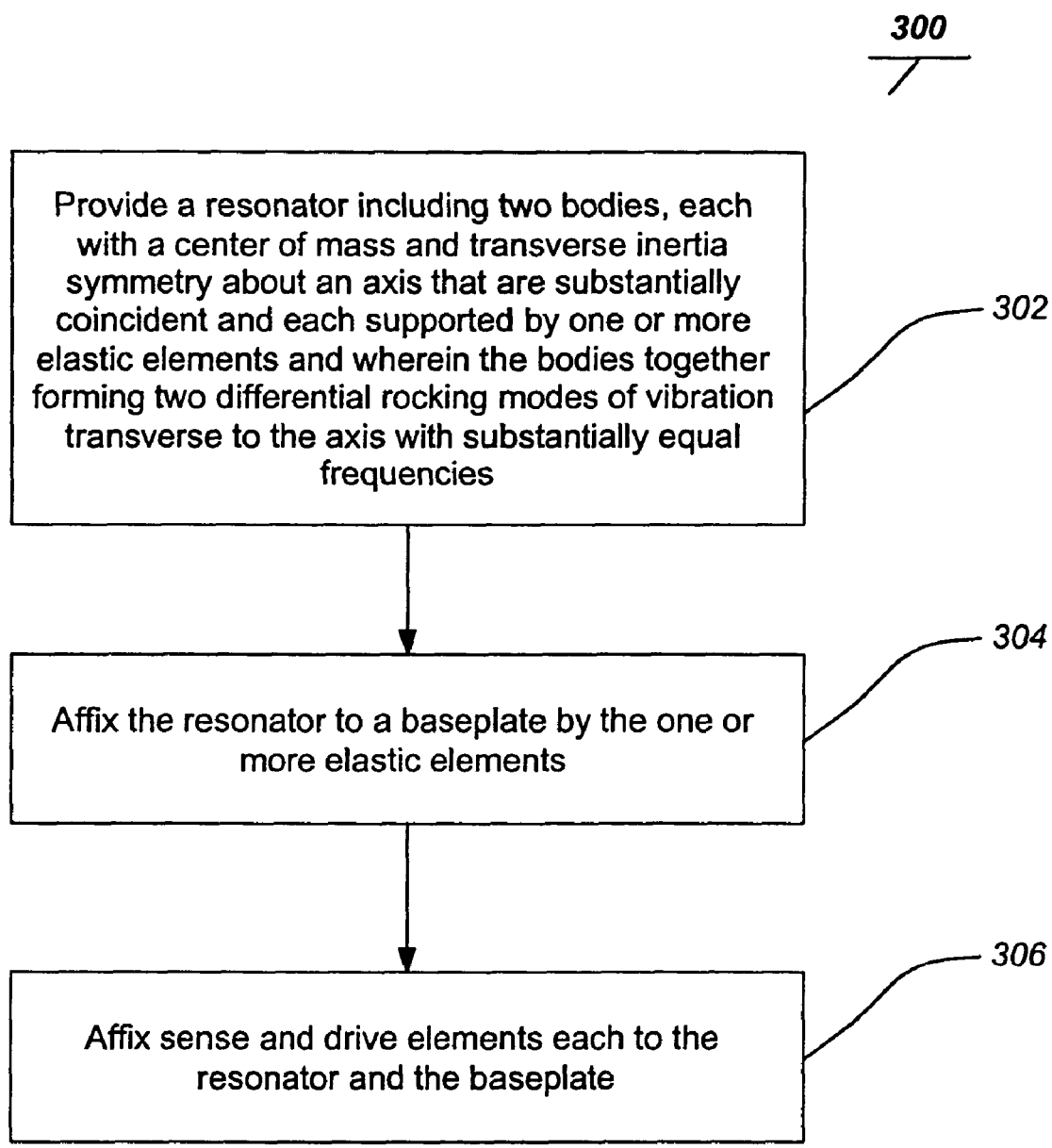
FIG. 3 is a flowchart of a typical method of using the invention.

FIG. 3 is a flowchart of a typical method 300 of the invention. The method comprises providing a resonator including a proof mass 102 and a counterbalancing frame 104 affixed to the proof mass 102 by one or more elastic elements 108 at block 302. Next, the resonator is bonded to a baseplate 106 by the one or more elastic elements 108 at block 304. The resonator is etched from conductive doped silicon and is rigidly and conductively bonded to the baseplate using gold-gold thermo compression bonding or gold-silicon eutectic bonding. Providing the resonator may comprise etching the entire proof mass 102 and counterbalancing frame 104 from a single silicon wafer or etching only a plate portion 118 of the proof mass 102 and the counterbalancing frame 104 from the silicon and bonding on a separate vertical portion 116 of the proof mass 102. A gold-gold thermo-compression bond for a silicon post or anodic bond for a pyrex post is used with critical precision bonding surfaces and dimensions defined by planar polishing. The method 300 also comprises affixing sense and drive electrode elements each to the baseplate 106 at block 306. The sense and drive elements may be formed on either the proof mass 102 or the counterbalancing frame 104.

The principle of operation of the invention is that the proof mass rocks against the counterbalancing frame with equal an opposite momentum. In the example embodiment of FIG. 1, the gyroscope 100 is made from a planar 550 micron thick silicon wafer, the proof mass 102 comprises a 20 mm×20 mm plate with 10 mm×5 mm×5 mm silicon posts bonded to both sides. The rocking inertia of the proof mass is approximately $I_r$=0.0581 kg-mm² and the axial inertia is approximately $I_z$=0.0390 kg-mm². Its angular gain for Coriolis sensing is approximately $1-I_z/I_r/2$=0.664, compared to 1 for an ideal Foucault pendulum. The angular gain for the flat frame is ~0 so the effective angular gain for the gyroscope is ~0.332 comparable to the typical value of 0.3 for a hemispherical or shell resonator. For reactionaless operation, the rocking inertia of the counterbalancing frame 104 substantially matches that of the proof mass 102, $I_r$. This can be achieved with a counterbalancing frame 104 outside dimension of approximately 30 mm and inner dimension of approximately 20 mm. The center of mass of the proof mass 102 and counterbalancing frame 104 are thus coincident at the center of the resonator Acceleration of the gyroscope thus produces no excitation of the differential rocking modes.

In the example embodiment, the elastic flexures 108 used to attach the proof mass 102 and counterbalancing frame 104 to the rigid baseplate 106 have a 0.55 mm square cross section and are fabricated by photolithography. The attachment to the counterbalancing frame 104 is at a position 10 mm from the resonator center an to the proof mass 102 is at 5 mm from the center. The attachment of the elastic elements 108 to the baseplate 106 is via 2.5 mm beams was selected to be at 7.13 mm from the resonator center in the example illustrated in FIG. 1. This value was arrived at from a preliminary finite element model analysis.

An analysis of the free modes of vibration of the resonator attached to a 3 mm thick 3 inch diameter silicon wafer identified two, degenerate counter-rocking modes of the counterbalancing frame 104 against the proof mass 102 at approximately 4295.77 Hz. The momentum transmitted to the baseplate 106 was found to be ¹⁄₁₅₀ that of a rocking momentum in the proof mass 102. With a locked frame, as in designs such as that of U.S. Pat. No. 5,894,090, all of the rocking momentum would be transmitted to the base wafer. Further examination of the finite element model results reveals how the balance is achieved about the X axis of a baseplate in this particular case: first, there is substantially no net in-plane torsion or normal force at each of the baseplate support points along the X axis; second, the residual in-plane torsional reactions at each of the beam attachments along the Y axis are counterbalanced at any point in the baseplate by the net moment due to the normal force also acting at these attachments. This demonstrates an approximately 150 fold improvement in mechanical isolation without resort to low frequency seismic isolation methods. The perfection of the balance and isolation is limited only by planar geometric design and fabrication precision and not by the size of the baseplate mass and its suspension frequency from the gyro case.

The present invention is thus appropriate for navigation grade vibratory gyroscopes in rugged environments. The isolation of the two rocking modes from rigid baseplate motion ensures that modal damping and associated gyroscope rate drift will be determined primarily by the losses within the precision machined silicon resonator and not by the much less precise external packaging losses. The inherent high Q of bulk crystal silicon and the excellent symmetry which has been demonstrated through photolithography of precision double-side polished silicon wafers at mesoscale can be exploited with the present invention to achieve excellent navigation grade vibratory gyroscope performance at low cost.

It is also understood that to achieve the full potential of low drift and noise performance using this isolated resonator principle will require even high final 3D mechanical precision than afforded by the precise wafer polishing, through-etched silicon micromachining and high quality silicon bonding outlined above. This can be preferably accomplished with this design by focused ion beam trimming, after the assembly of the resonator onto its baseplate, of the dimensions of the elastic beam elements or the mass elements of the resonator, e.g. frame or post. This post assembly trimming can take advantage of the highly sensitive built in capacitive sensors to increase the degree of initial isolation and tuning to subatomic precision. Electrostatic bias trimming to modify the overall modal stiffness with the built in capacitance electrodes or special purpose electrodes can be used to maintain this isolation and tuning after vacuum packaging and at varying temperatures throughout the life of the gyroscope.

In addition, other modes of implementation are also possible in which the elastic elements are not necessarily discrete but rather built into the frame and plate elements of the proof mass. The essential requirement is that there be no net reaction or momentum transfer to the baseplate.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A resonator gyroscope, comprising:
   a resonator including two bodies, each with a center of mass and transverse inertia symmetry about an axis that are substantially coincident and each supported by one or more elastic elements and wherein the bodies together form two differential rocking modes of vibration transverse to the axis with substantially equal frequencies; and
   a baseplate affixed to the resonator by the one or more elastic elements;
   wherein the two bodies transfer substantially no net momentum to the baseplate when the resonator is excited.

2. The resonator gyroscope of claim 1, wherein the resonator is symmetric.

3. The resonator gyroscope of claim 1, wherein the baseplate is rigid.

4. The resonator gyroscope of claim 1, wherein the baseplate is flexible.

5. The resonator gyroscope of claim 1, wherein a first one of the bodies is a proof mass and second one of the bodies is a counterbalancing frame and wherein the proof mass is affixed to the counterbalancing frame by the one or more elastic elements.

6. The resonator gyroscope of claim 5, wherein the counterbalancing frame has a rocking inertia substantially comparable to that of the proof mass.

7. The resonator gyroscope of claim 5, wherein the one or more elastic elements are integral to the counterbalancing frame.

8. The resonator gyroscope of claim 5, wherein the proof mass, counterbalancing frame and baseplate are machined from silicon.

9. The resonator gyroscope of claim 5, further comprising sense and drive elements affixed to the baseplate.

10. The resonator gyroscope of claim 5, wherein the proof mass comprises a vertical portion and a central plate portion.

11. The resonator gyroscope of claim 10, wherein the vertical portion is a separate element bonded to the central plate portion.

12. The resonator gyroscope of claim 10, wherein the one or more elastic elements are integral to the central plate portion.

13. The resonator gyroscope of claim 10, wherein the central plate portion, one or more elastic elements and the counterbalancing frame are produced by through etching a precision silicon wafer.

14. A method of producing a resonator gyroscope, comprising the steps of:
   providing a resonator including two bodies, each with a center of mass and transverse inertia symmetry about an axis that are substantially coincident and each supported by one or more elastic elements and wherein die bodies together form two differential rocking modes of vibration transverse to the axis with substantially equal frequencies; and
   affixing the resonator to a baseplate by the one or more elastic elements;
   wherein the two bodies transfer substantially no net momentum to the baseplate when the resonator is excited.

15. The method of claim 14, wherein the resonator is symmetric.

16. The method of claim 14, wherein the baseplate is rigid.

17. The method of claim 14, wherein the baseplate is flexible.

18. The method of claim 14, wherein a first one of the bodies is a proof mass and second one of the bodies is a counterbalancing franc and wherein the proof mass is affixed to the counterbalancing frame by the one or more elastic elements.

19. The method of claim 18, wherein the counterbalancing frame has a rocking inertia substantially comparable to that of the proof mass.

20. The method of claim 18, wherein the one or more elastic elements are produced integral to the counterbalancing frame.

21. The method of claim 18, wherein the steps of producing and affixing comprise machining the proof mass, counterbalancing frame and baseplate from silicon.

22. The method of claim 18, further comprising affixing sense and drive elements to the baseplate.

23. The method of claim 18, wherein the proof mass comprises a vertical portion and a central plate portion.

24. The method of claim 23, wherein the vertical portion is a separate element from the central plate portion and the step of producing the proof mass comprises bonding the vertical portion to the central plate portion.

25. The method of claim 23, wherein the one or more elastic elements are integral to the central plate portion.

26. The method of claim 23, wherein the central plate portion, one or more elastic elements and the counterbalancing frame are produced by through etching a precision silicon wafer.

* * * * *